(12) United States Patent
Price, III

(10) Patent No.: US 6,912,789 B2
(45) Date of Patent: Jul. 5, 2005

(54) MULTIPURPOSE ROTARY CUTTING TOOL HAVING INTERCHANGEABLE HEADS

(75) Inventor: Joseph E. Price, III, Roswell, GA (US)

(73) Assignee: Shakespeare Company LLC, Columbia, SC (US)

(*) Notice: Subject to any disclaimer, the term of this patent is extended or adjusted under 35 U.S.C. 154(b) by 0 days.

(21) Appl. No.: 10/758,436

(22) Filed: Jan. 15, 2004

(65) Prior Publication Data
US 2004/0148785 A1 Aug. 5, 2004

Related U.S. Application Data

(63) Continuation of application No. 09/927,287, filed on Aug. 10, 2001, now abandoned.
(60) Provisional application No. 60/224,908, filed on Aug. 11, 2000.

(51) Int. Cl.$^7$ ............................................... A01D 50/00
(52) U.S. Cl. .......................... 30/276; 83/666; 403/289
(58) Field of Search ..................... 30/276, 376; 83/666, 83/698.41; 451/514, 515, 548; 403/408.1, 289, 329; 411/508, 510; 409/232, 234; 279/89, 90, 46.1; 56/12.7

(56) References Cited

U.S. PATENT DOCUMENTS

| | | | |
|---|---|---|---|
| 1,391,221 A | | 9/1921 | Tuttle |
| 2,472,184 A | * | 6/1949 | Anest .......................... 403/327 |
| 2,480,739 A | | 8/1949 | Johnson |
| 2,560,530 A | * | 7/1951 | Burdick ....................... 411/508 |
| 2,777,140 A | | 1/1957 | Hastrup |
| 3,378,869 A | | 4/1968 | Schwartz |
| 3,877,146 A | | 4/1975 | Pittinger |
| 4,043,685 A | * | 8/1977 | Hyams ......................... 403/19 |
| 4,062,114 A | | 12/1977 | Luick |
| 4,089,114 A | | 5/1978 | Doolittle et al. |
| 4,114,269 A | | 9/1978 | Ballas, Sr. |
| 4,189,833 A | | 2/1980 | Kwater |
| 4,265,018 A | | 5/1981 | Schrock et al. |
| 4,270,271 A | | 6/1981 | Feldman et al. |
| 4,406,065 A | | 9/1983 | Kohler |
| D280,903 | | 10/1985 | Barbula |
| 4,790,071 A | | 12/1988 | Helmig et al. |
| D299,484 | | 1/1989 | Lee |
| D301,110 | | 5/1989 | Barbula |
| D303,067 | | 8/1989 | Pinson et al. |
| 4,856,194 A | | 8/1989 | Lee |
| 4,898,493 A | * | 2/1990 | Blankenburg ................ 403/326 |
| 4,916,886 A | * | 4/1990 | Nakamura et al. ........... 56/12.7 |
| 4,926,557 A | | 5/1990 | Haupt |
| 5,020,223 A | | 6/1991 | Desent et al. |
| 5,020,224 A | | 6/1991 | Haupt |
| 5,109,607 A | | 5/1992 | Everts |
| 5,109,656 A | | 5/1992 | Zimmer |
| 5,136,782 A | | 8/1992 | Calcinai |
| D347,150 | | 5/1994 | Falconbridge |
| 5,430,943 A | | 7/1995 | Lee |
| 5,461,787 A | | 10/1995 | Araki et al. |
| 5,493,785 A | | 2/1996 | Lawrence |
| 5,588,329 A | | 12/1996 | Nedachi |
| 5,617,636 A | | 4/1997 | Taggett et al. |
| 5,640,836 A | | 6/1997 | Lingerfelt |
| 5,657,542 A | | 8/1997 | White, III et al. |
| 5,659,964 A | | 8/1997 | Lawrence |
| 5,722,172 A | | 3/1998 | Walden |
| 5,749,148 A | | 5/1998 | White, III et al. |
| 5,836,227 A | | 11/1998 | Dees, Jr. et al. |
| 5,862,598 A | | 1/1999 | Lee |
| 5,887,349 A | | 3/1999 | Walden |

(Continued)

Primary Examiner—Kenneth E. Peterson
(74) Attorney, Agent, or Firm—Renner, Kenner, Greive, Bobak, Taylor & Weber

(57) ABSTRACT

A multi-purpose rotary cutting tool having a plurality of interchangeable head attachments, wherein the head attachments are easily attached and detached to a rotary cutting device, thereby providing various tools for a multitude of applications.

10 Claims, 8 Drawing Sheets

U.S. PATENT DOCUMENTS

| | | |
|---|---|---|
| 5,950,317 A | 9/1999 | Yates et al. |
| 5,987,756 A | 11/1999 | Yates et al. |
| 6,112,416 A | 9/2000 | Bridges et al. |
| 6,126,356 A * | 10/2000 | Russell ........................ 403/24 |
| 6,322,282 B1 * | 11/2001 | Kussman et al. ............ 403/329 |
| 6,389,759 B2 * | 5/2002 | McGrath et al. ............ 52/127.1 |
| 2001/0003935 | 6/2001 | Morabit et al. |

\* cited by examiner

MULTIPURPOSE ROTARY CUTTING TOOL HAVING INTERCHANGEABLE HEADS

CROSS REFERENCE TO RELATED APPLICATIONS

This application is a continuation application of U.S. application Ser. No. 09/927,287, filed Aug. 10, 2001, now abandoned, which claims the benefit of U.S. Provisional Application No. 60/224,908, filed Aug. 11, 2000.

TECHNICAL FIELD

The present invention relates generally to landscape maintenance devices and, more specifically, to a landscaping device with easily interchangeable heads, capable of performing a variety of functions including the cutting of plants and grass, the cultivating of soil, and the brushing of surfaces. The present invention is particularly useful in, although not strictly limited to, landscape applications desiring edging, trimming, cutting and cultivating.

BACKGROUND OF THE INVENTION

With the rapid growth of developed land, interest and involvement in landscaping and gardening has increased dramatically. What was once viewed as a hobby has now grown into a multi-billion dollar industry. Developers seeking to establish an image for their communities provide spectacular greenscapes with floral backdrops. Business owners, too, look to adorn their properties with naturally decorated scenery. Individual homeowners recognize the equity value of a well-landscaped and maintained property. Furthermore, theme gardens and outdoor landscape retreat areas have realized a new popularity and are desired and enjoyed by many.

Creating and maintaining a beautifully adorned landscape, however, is not without effort. If a desired location is wild, the brush and weeds must be cleared and the soil prepared before planting or seeding can begin. If a landscaped site is to be redesigned, it must also be cleared of unwanted plaints and weeds and be prepared to receive new foliage. Furthermore, after a designed area is completed, continual maintenance including trimming, edging and pruning is necessary.

Typically, an individual preparing a site for planting would require a variety of tools. First, a grass or weed trimming device would be needed for initial clearing. For this task, a manual device such as a sickle, scythe or reaper, or a motorized rotating-line cutting device could be employed. After such initial clearing, a second tool is often needed to cut thicker brush. This step could rely upon a handsaw, heavy-duty shears or a chain saw. Finally, after clearing away unwanted brush and weeds, the soil would need to be prepared for planting, thus requiring yet another tool to be employed, such as a hoe or a tilling machine. As such, it is clear that the necessity of so many tools is disadvantageous.

Rotary cutting heads are known in the art. Examples of such devices may be found by reference to U.S. Pat. No. 4,856,194 to Lee, U.S. Pat. No. 4,270,271 to Feldman et al., U.S. Pat. No. 5,136,782 to Calcinai and U.S. Pat. No. 4,043,685 to Hyams. However, in view of the present invention, these patents are disadvantageous.

For instance, the referenced patents do not provide for easily detachable and interchangeable heads that serve a multitude of applications. As such, these disadvantages limit the use of the above references for multi-purpose tasks.

Therefore, it is readily apparent that there is a need for a landscape device with easily interchangeable heads, capable of performing a variety of functions including the cutting of plants and grasses and the cultivating of soil and thus preventing the above-discussed disadvantages.

BRIEF SUMMARY OF THE INVENTION

Briefly described, in a preferred embodiment, the present invention overcomes the above-mentioned disadvantages, and meets the recognized need for such a device, by providing a multi-purpose rotary cutting tool having a plurality of interchangeable head attachments, wherein the head attachments are easily attached and detached to a rotary cutting device, thereby providing various tools for a multitude of applications.

More specifically, the present invention comprises generally a bell-shaped portion and a plurality of head attachments, wherein the bell-shaped portion of removably attached to the shaft of a standard rotary cutting device and wherein the head attachment is releasably locked to the bell-shaped portion via a retaining clip. The retaining clip preferably comprises two semi-flexible locking jaws that extend through channels formed in the head attachment and engage within apertures formed in the bell-shaped portion such that the locking jaws extend to the exterior of the bell-shaped portion. As such, by simply applying hand force, the locking jaws can be disengaged from the bell-shaped portion, thereby allowing the head attachment to be removed therefrom.

A plurality of head attachments having various tools attached thereto or formed therein are provided that are interchangeable and interlocking with bell-shaped member. For instance, in a preferred form, a head attachment having cutting blades, a head attachment having a fixed cutting line, a head attachment having cultivation protrusions, and a head attachment having one or more brushes are provided. The blade cutting head attachment generally comprises three cutting blades pivotally attached to pins positioned between the bell-shaped portion and the head attachment. The fixed-line head attachment preferably comprises one or more cutting lines that extend to the exterior of the apparatus for cutting in a rotating motion. The cultivation head attachment preferably comprises a plurality of protrusions extending to the bottom of the head attachment and that serve to churn or cultivate the soil. The brush-head attachment preferably comprises one or more downwardly facing brushes.

A feature and advantage of the present invention is to provide a multi-purpose rotary cutting tool having interchangeable head attachments.

A feature and advantage of the present invention is to provide a multi-purpose rotary cutting tool having interchangeable head attachments that can be attached or removed without the need for additional tools.

A feature and advantage of the present invention is to provide a multi-purpose rotary cutting tool having an interchangeable blade-cutting head attachment.

A feature and advantage of the present invention is to provide a multi-purpose rotary cutting tool having an interchangeable fixed-line head attachment.

A feature and advantage of the present invention is to provide a multi-purpose rotary cutting tool having an interchangeable cultivating head attachment.

A feature and advantage of the present invention is to provide a multi-purpose rotary cutting tool having an interchangeable brush head attachment.

A feature and advantage of the present invention is to provide a multi-purpose rotary cutting tool that is easily attached to known and available rotary cutting devices.

A feature and advantage of the present invention is to provide a multi-purpose rotary cutting tool that eliminates the need for multiple tools.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATE EMBODIMENTS

In describing the preferred and alternate embodiments of the present invention, as illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
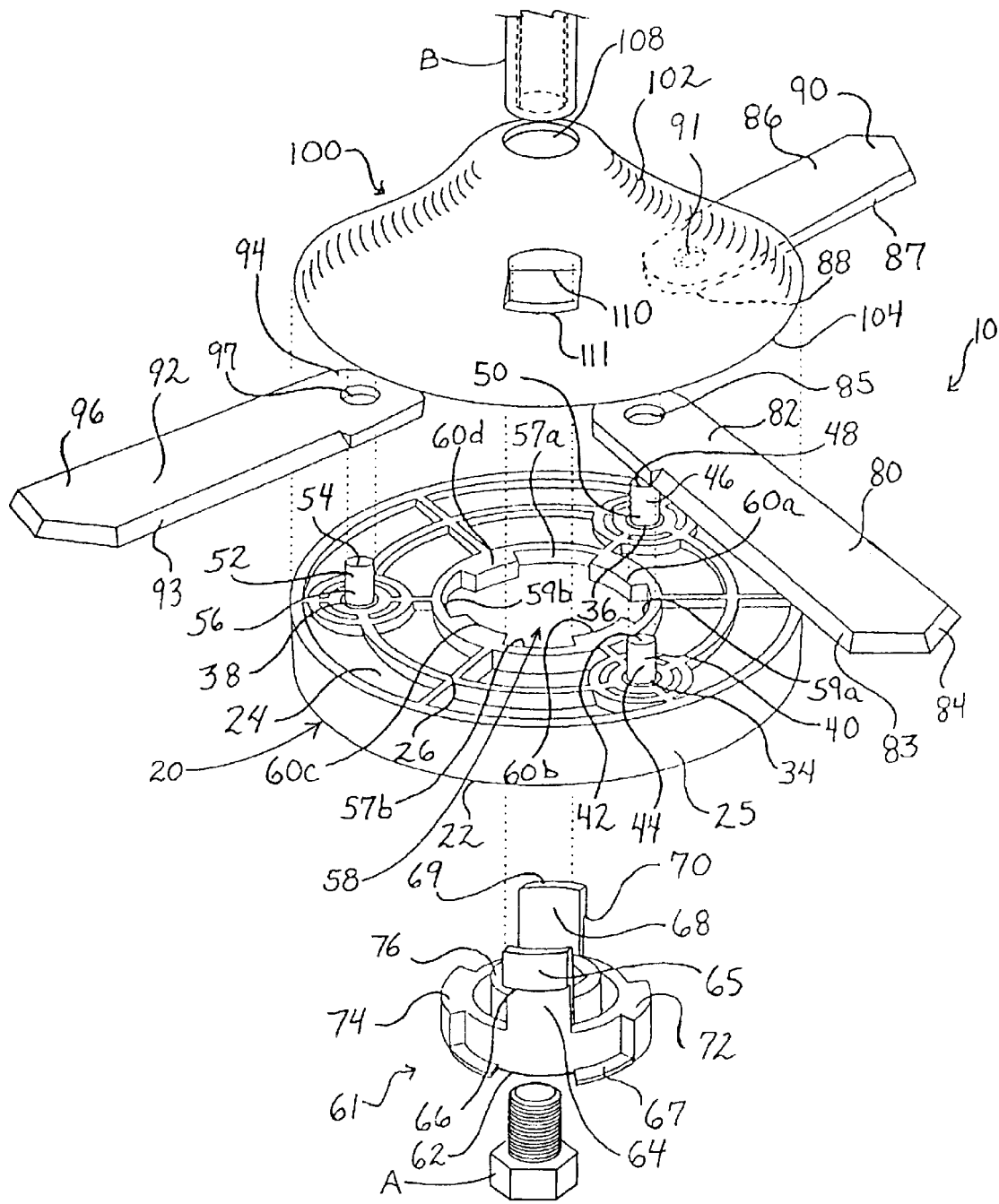
FIG. 1 is a perspective view of a blade cutting assembly according to a preferred embodiment of the present invention shown in a separated position.
Figure 2:
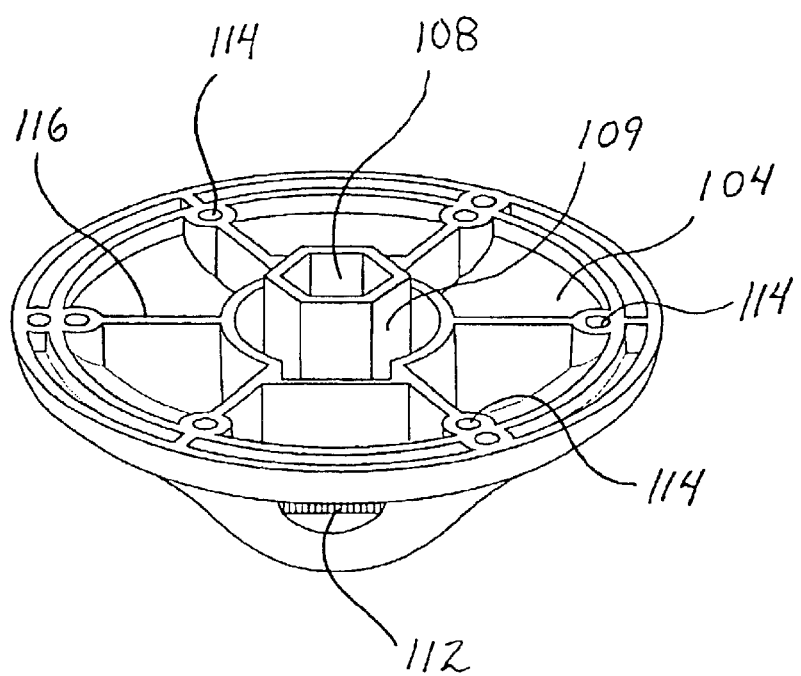
FIG. 2 is a bottom perspective view of the bell-shaped member according to a preferred embodiment of the present invention.

Referring now to FIGS. 1 and 2, apparatus 10 generally comprises bell-shaped member 100, blade head 20 and blades 80, 86 and 92. More specifically, blade head 20 is generally cylindrically shaped and has first side 22, second side 24 and peripheral wall 25. A throughhole 58 is formed through the center of blade head 20 for receiving retaining clip 61 as more fully described below. Preferably four spaced-apart tabs 60a, 60b, 60c and 60d are formed on blade head 20 at throughhole 58. Tabs 60a, 60b, 60c and 60d together define four channels 57a, 57b, 59a, 59b therethrough for receiving locking jaws 64 and 68, and alignment tabs 72 and 74, respectively, of retaining clip 61, as more fully described below, wherein channel 57a is defined between tabs 60a and 60d, channel 57b is defined between tabs 60b and 60c, channel 59a is defined between tabs 60a and 60b, and channel 59b is defined between tabs 60c and 60d.

Preferably, a plurality of ribs 26 are radially and axially formed on second side 24 of blade head 20 to provide structural support thereto. Preferably, three pins 40, 46 and 52 extend from second surface 24 of blade head 20 and are approximately evenly spaced-apart radially for engaging with bell-shaped member 100 as more fully described below. Pins 40, 46 and 52 are generally cylindrically shaped having first ends 42, 48 and 54, respectively, and second ends 44, 50 and 56, respectively, respectively, wherein second ends 44, 50 and 56 of pins 40, 46 and 52, respectively, are secured within apertures 34, 36 and 38, respectively, of blade head 20. Pins 40, 46 and 52 may be formed as an integral part of blade 20 or may be attached within apertures 34, 36 and 38, respectively, by any known means such as, for exemplary purposes only, glue, threads or frictional fit. Pins 40, 46 and 52, serve to secure and to provide a pivot point for cutting blades 80, 86 and 92, respectively.

Cutting blades 80, 86 and 92 are generally rectangular-shaped members having first end 82, 88 and 94, respectively, and second end 84, 90 and 96, respectively. Formed along the edges of cutting blades 80, 86 and 92, proximal to second end 84, 90 and 96, respectively, are cutting edges 83, 87 and 93, respectively, for providing a cutting surface during operation. Cutting surfaces 83, 87 and 93 may be formed along the edges and/or on the ends of the respective cutting blades 80, 86 and 92. Formed proximal to first end 82, 88 and 94 of cutting blades 80, 86 and 92, respectively, are throughholes 85, 91 and 97, dimensioned for receiving pins 40, 46 and 52, respectively. Throughholes 85, 91 and 97 are dimensioned slightly larger than pins 40, 46 and 52, respectively, to allow cutting blades 80, 86 and 92 to rotate or pivot thereabout as apparatus 10 is rotated.

Bell-shaped member 100 generally comprises a first side 102 and a second side 104, wherein first side 102 is generally bell-shaped and second side 104 is generally flat-shaped. Throughhole 108 is formed at the center of bell-shaped member 100 and extends through to second side 104 and is dimensioned for receiving the shaft B of rotary cutting device A (not shown). An extension 109, defining a hexagon-shaped channel, extents outward from second side 104 of bell-shaped member 100 for securing a hexagon bolt (A). The shaft of the rotary cutting device has a threaded end that is extended through throughhole 108 and into extension 109; a bolt is threaded onto the shaft B by the bolt being held in a radially fixed position within the hexagon-shaped channel of extension 109 wherein the shaft is rotated and thus easily attached to bell-shaped member 100.

preferably, a plurality of radially and axially positioned ribs 116 are formed on second surface 104 to provide structural support to bell-shaped member 100. A plurality of cylindrically-shaped receiving holes 114 are formed on second surface 104 for receiving first ends 42, 48 and 54, of pins 40, 46 and 52, respectively. Receiving holes 114 are positioned such that when pins 40, 46 and 52 are received therein, channels 57a and 57b align with retaining apertures 110, 112 of bell-shaped member 100. Retaining apertures 110, 112 are formed in bell-shaped member 100 proximal to throughhole 108 and are generally rectangular-shaped having lips 111 and 113, respectively, defined on first surface 102. As more fully described below lips 111 and 113 serve as a securing surface for locking jaws 64 and 68, respectively, of retaining clip 61.

Retaining clip 61 is provided for removably locking blade head 20 to bell-shaped member 100. Retaining clip 61 is generally cylindrically shaped having first side 62 and second side 63, wherein retaining jaws 64 and 68 extend from second side 63 at preferably radially opposing positions and serves as a means for removably locking to bell-shaped member 100. More specifically tabs 65 and 69 are formed at the distal end of jaws 64 and 68, respectively, thereby forming a lip 66 and 70, respectively. Locking jaws 64 and 68, are dimensioned for extending through channels 57a and 57b, and then through retaining apertures 110 and 112 of bell-shaped member 100, wherein lips 66 and 70 of retaining jaws 64 and 68, respectively, mate with lips 111 and 113 of retaining apertures 110 and 112, respectively. Locking jaws 64 and 68 are dimensioned and positioned such that when locking laws 64 and 68 are extended through retaining apertures 110 and 112, tabs 65 and 69, respectively, are urged outward and against lips 111 and 113, respectively. Head 20 is thus retained between its contact with member 100 and the interaction of its tabs 60a–d with retaining flanges 67 of retaining clip 61. Locking jaws 64 and 68 are flexible enough to allow tabs 65 and 69 to be squeezed toward each other by a hand force to disengage lips 66 and 70, respectively, from lips 111 and 113 of retaining apertures 110 and 112, respectively, thereby allowing retaining clip 61 to be removed and thus blade head 20 to be disengages from bell-shaped member 100. It should be noted that although a bell-shaped member is preferred, other shapes may be utilized.

Figure 3:
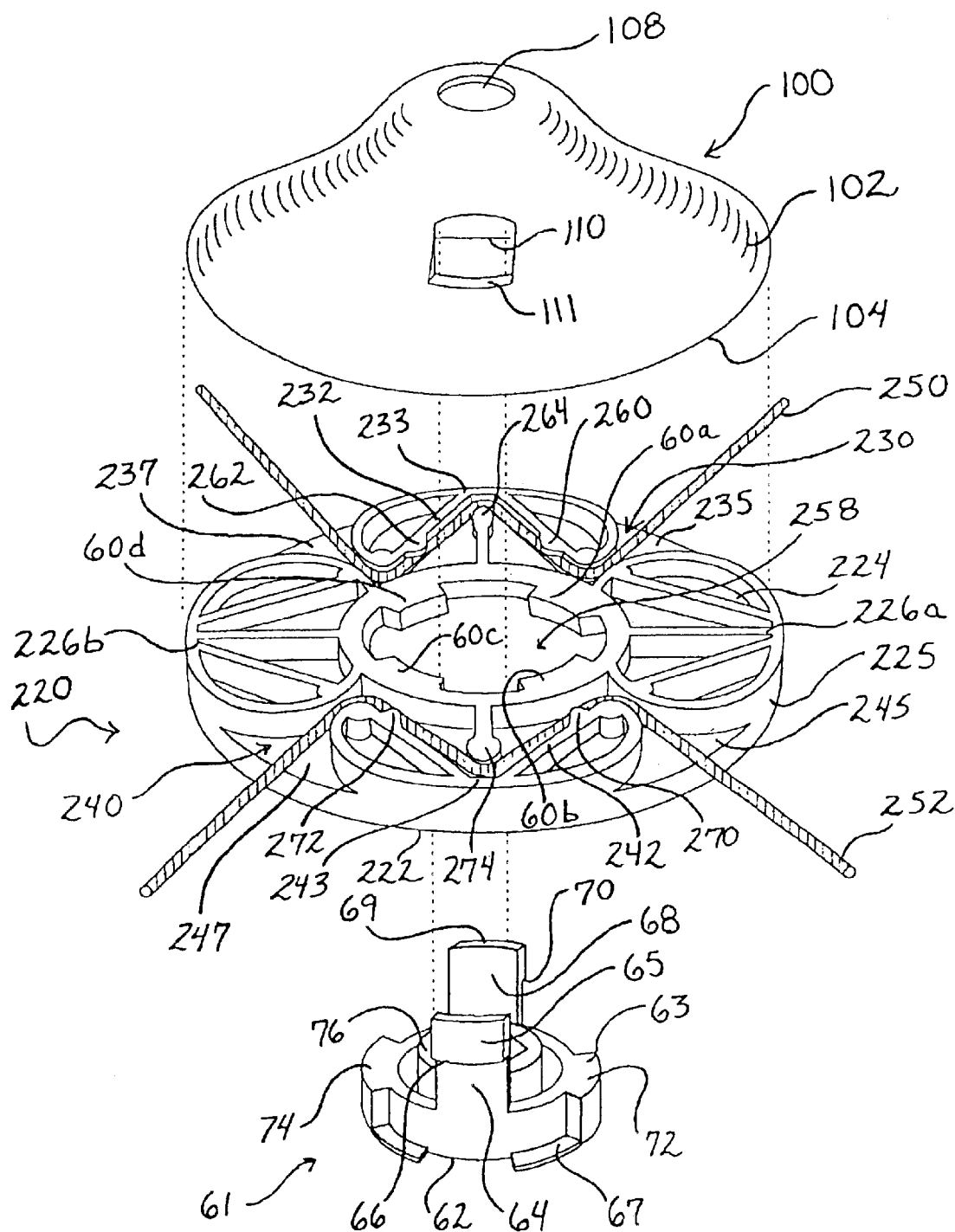
FIG. 3 is a perspective view of a fixed-line cutting assembly according to a preferred embodiment of the present invention shown in a separated position.

Now referring to FIG. 3, a fixed-line head 220 is provided. Fixed-line head 220 comprises a first side 222, a second side 224 and a peripheral wall 225, wherein fixed-line head 220 is generally cylindrically shaped. A throughhole 258 is formed at the center of fixed-line head 220 for receiving retaining clip 61. A plurality of support ribs 226a, 226b are positioned on opposing sides of throughhole 258 to provide structural support for fixed-line head 220. A plurality of strategically positioned guide ribs 232 and 242 extend from second side 224 and are positioned to form generally V-shaped channels 230 and 240, respectively, on opposing radial sides of fixed-line head 220.

Cutting line 250 is channeled through V-shaped channel 230 and extends to the exterior of fixed line head 220 at both ends through a first aperture 235 and a second aperture 237, wherein first aperture 235 is approximately ninety radial degrees from second aperture 237. Retaining members 260, 262 and 264 extend from guide ribs 232 and over V-shaped channel 230 thereby extending over line 250 to retain line 250 into position within channel 230. First retaining member 260 is preferably positioned at the distal end of V-shaped guide rib 232; second retaining member 262 preferably is positioned at the other distal end of V-shaped guide rib 232; and third retaining member 264 is preferably positioned at the apex 233 of V-shaped guide rib 232.

Cutting line 252 is channeled through V-shaped channel 240 and extends to the exterior of fixed line head 220 at both ends through a first aperture 245 and a second aperture 247, wherein first aperture 245 is approximately ninety radial degrees from second aperture 247. Retaining members 270, 272 and 274 extend from guide ribs 242 and over V-shaped channel 240 thereby extending over line 252 to retain line 252 into position within channel 240. First retaining member 270 is preferably positioned at the distal end of V-shaped guide rib 242; second retaining member 272 preferably is positioned at the other distal end of V-shaped guide rib 242; and third retaining member 274 is preferably positioned at the apex 243 of V-shaped guide rib 242.

Because of the semi-rigidity of lines 250 and 252 and because of the frictional contact between V-shaped guide ribs 232 and 242, respectively, and retaining members 260, 264, 262 and retaining members 270, 272, 274, respectively, lines 250 and 252 are removably fixed within channels 230 and 240, respectively, such that during rotational cutting, lines 250 and 252 will remain in the position as initially installed. A user can remove lines 250 and 252 to replace or inspect by simply manipulating lines 250 and 252 around the respective retaining members 260, 262, 264 and retaining members 270, 272, 274, respectively.

Similar in functionality as with the blade head attachment 20, as discussed above, locking jaws 64 and 68 of retaining clip 61 extends through throughhole 258 of fixed-line head 220 and into and through apertures 110 and 112 of bell-shaped member 100, thereby removably securing fixed line head 220 to bell-shaped member 100. Locking jaws 64 and 68 are dimensioned and positioned such that when locking jaws 64 and 68 are extended through retaining apertures 110 and 112, tabs 65 and 69, respectively, are urged outward and against lips 111 and 113, respectively. Locking jaws 64 and 68 are flexible enough to allow tabs 65 and 69 to be squeezed toward each other by a hand force to disengage lips 66 and 70, respectively, from lips 111 and 113 of retaining apertures 110 and 112, respectively, thereby allowing retaining clip 61 to be removed and thus fixed-line head 220 to be disengaged from bell-shaped member 100.

Figure 4:
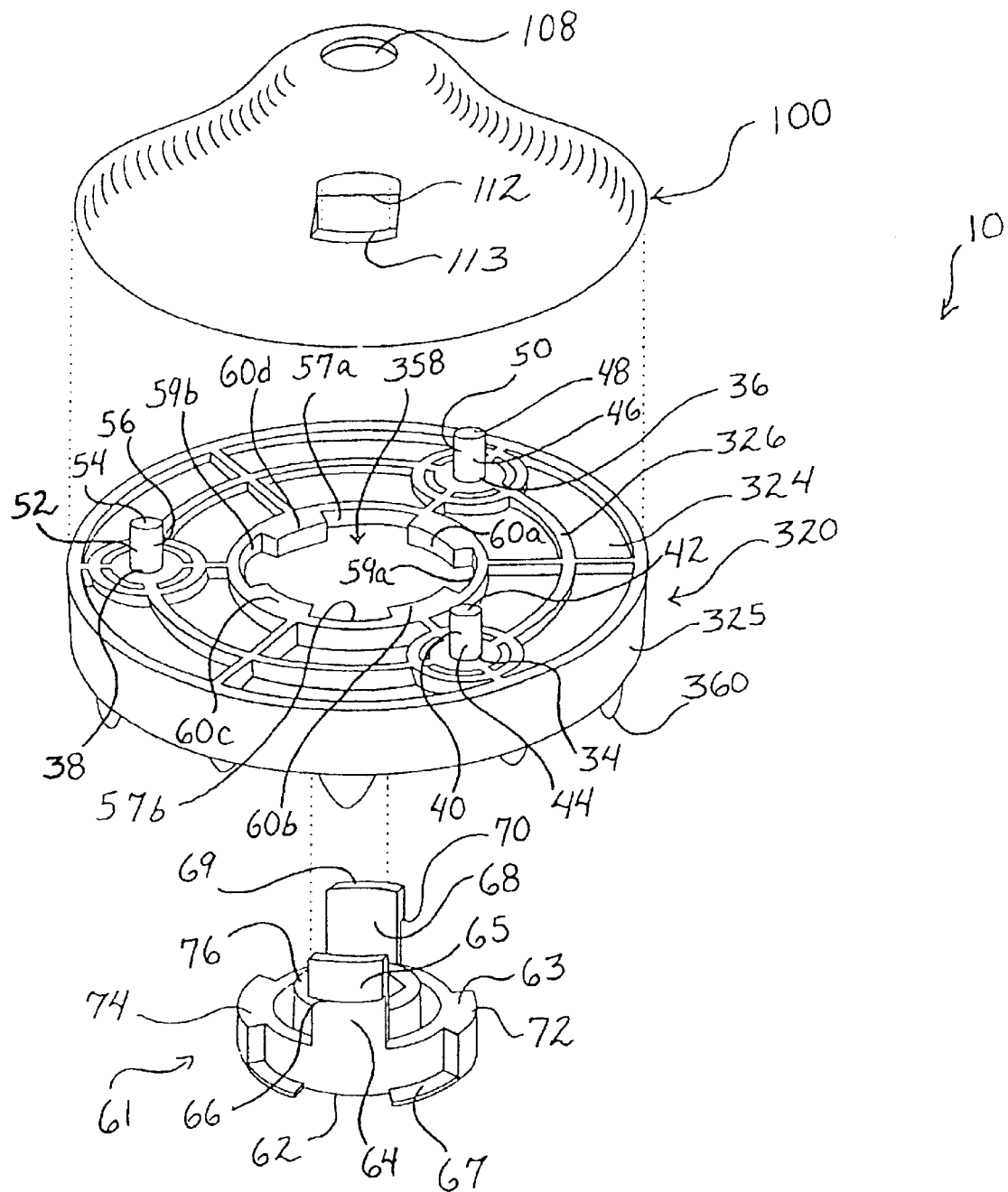
FIG. 4 is a perspective view of a cultivator assembly according to a preferred embodiment of the present invention shown in a separated position.
Figure 5:
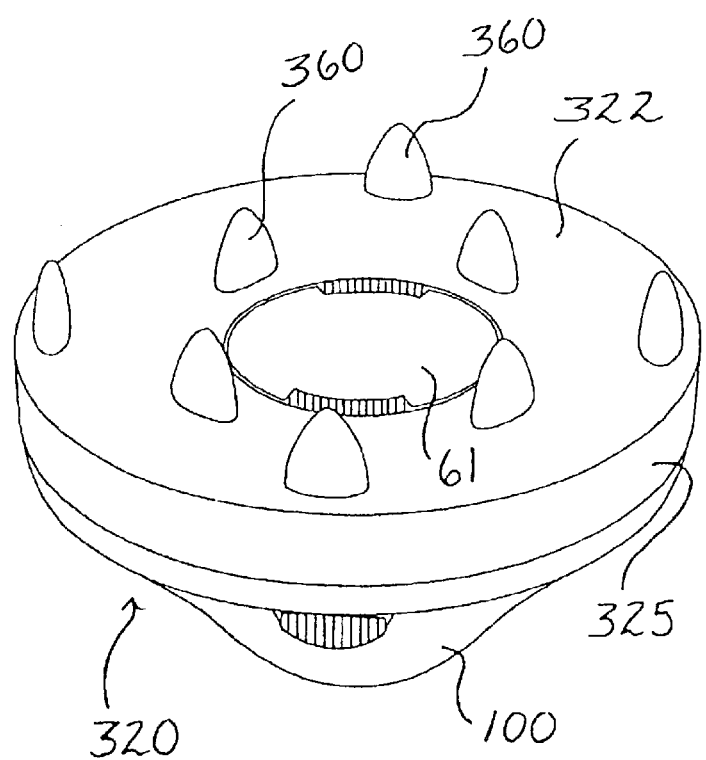
FIG. 5 is a perspective view of a cultivator assembly according to a preferred embodiment of the present invention shown in an assembled position.

Now referring to FIGS. 4–5, a cultivating head 320 is provided. Cultivation head 320 comprises first side 322, second side 324 and peripheral wall 325, wherein cultivating head 320 is generally cylindrically shaped. A throughhole 358 is formed at the center of cultivating head 320 for receiving retaining clip 61. Support ribs 336 are positioned on second side 324 to provide structural support for cultivating head 320. A plurality of spaced-apart protrusions 360 extend generally perpendicular from first side 322. Protrusions 360 are preferably pointed or extend to an apex and serve to churn or cultivate the ground when rotary cutting device A is operated. It should be noted that various shaped protrusions 360 may be utilized as desired.

Similar in functionality as with the blade head attachment 20, as discussed above, locking jaws 64 and 68 of retaining clip 61 extends through throughhole 358 of cultivating head 320 and into and through apertures 110 and 112 of bell-shaped member 100, thereby removably securing cultivating head 320 to bell-shaped member 100. Locking jaws 64 and 68 are extended through retaining apertures 110 and 112, tabs 65 and 69, respectively, are urged outward and against lips 111 and 113, respectively. Locking jaws 64 and 68 are flexible enough to allow tabs 65 and 69 to be squeezed toward each other by a hand force to disengage lips 66 and 70, respectively, thereby allowing retaining clip 61 to be removed and thus cultivating head 320 to be disengaged from bell-shaped member 100.

Figure 6:
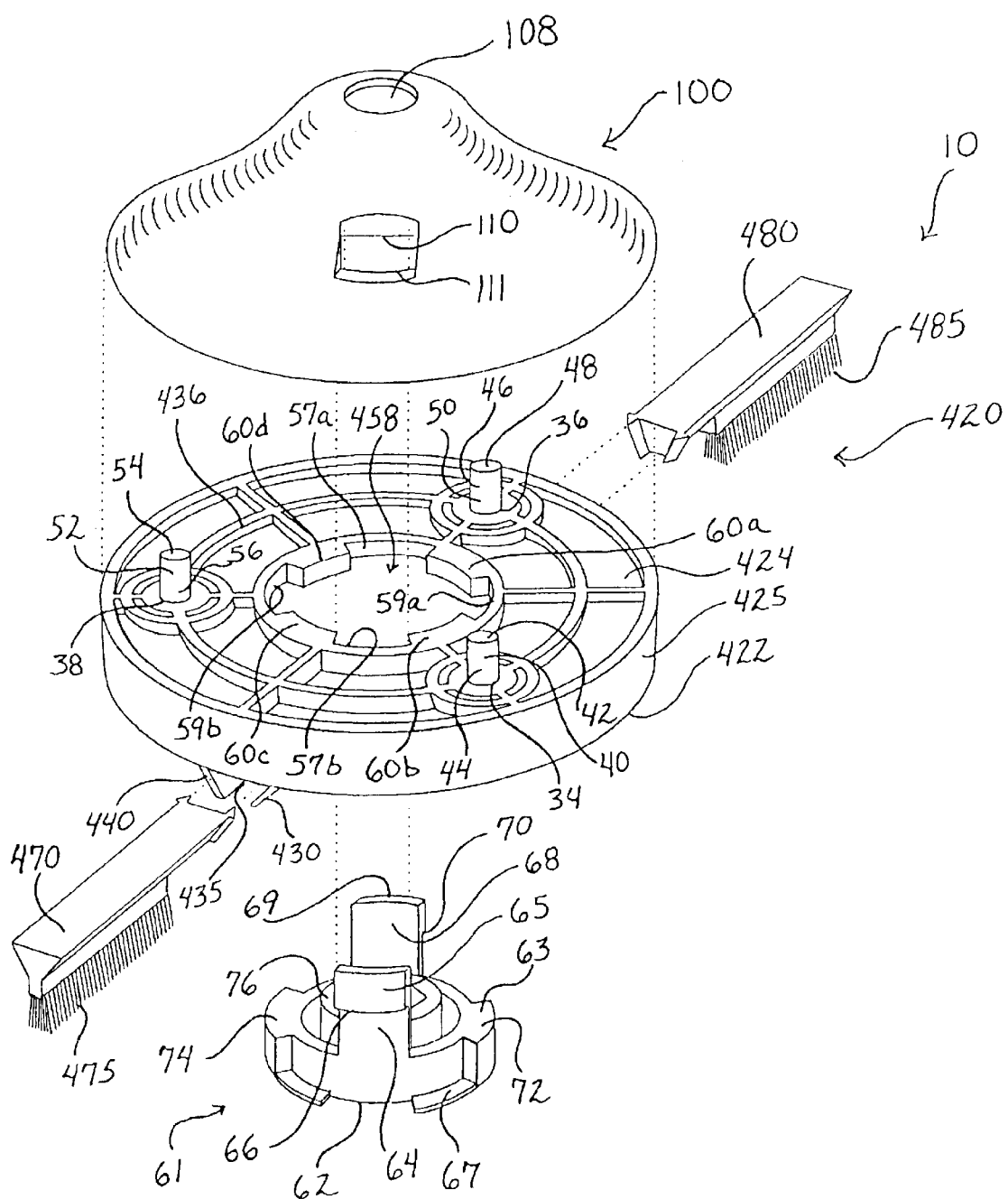
FIG. 6 is a perspective view of a brush assembly according to a preferred embodiment of the present invention shown in a separated position.
Figure 7:
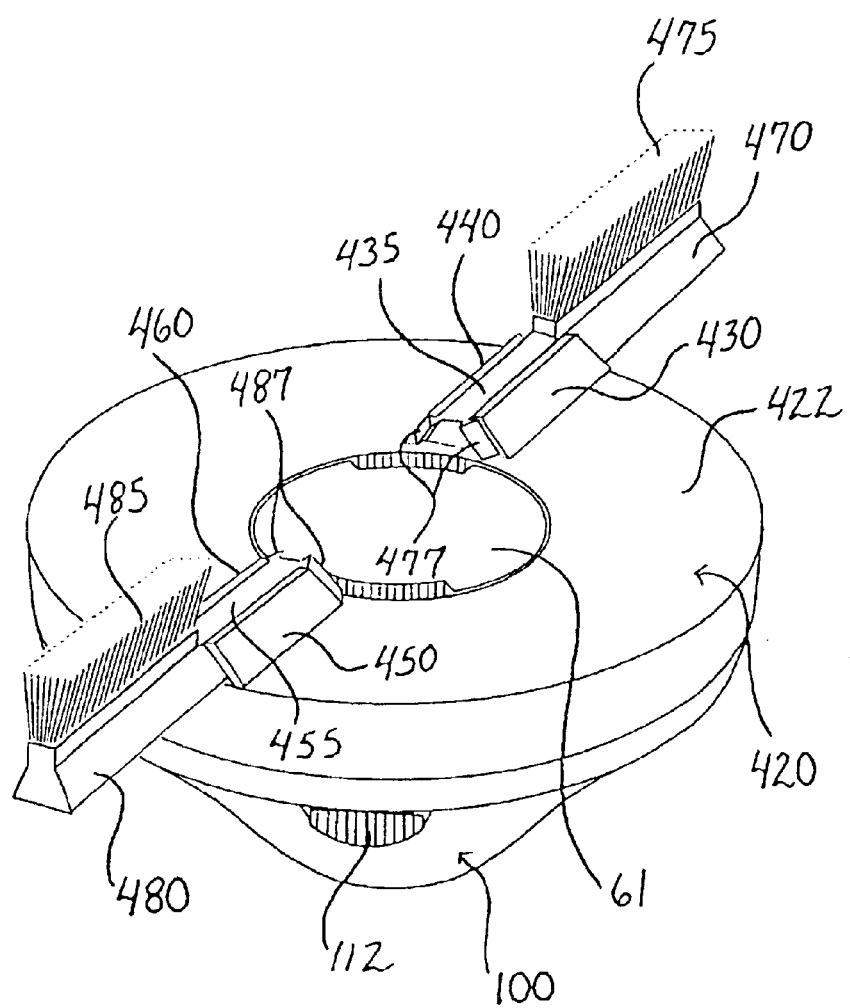
FIG. 7 is a perspective view of a brush assembly according to a preferred embodiment of the present invention shown in an assembled position.

Now referring to FIGS. 6–7, a brush head 420 is provided. Brush head 420 comprises first side 422, second side 424 and peripheral wall 425, wherein brush head 420 is generally cylindrically shaped. A throughhole 458 is formed at the center of brush head 420 for receiving retaining clip 61. Support ribs 436 are positioned on second side 424 to provide structural support for brush head 420. A first plate 430 and a second plate 440 extend from first side 422 of brush head 420 each at an angle therefrom. First plate 430 and second plate 440 are spaced apart and angled toward each other thereby forming a generally triangular channel 435 therebetween. Positioned on the radially opposing side of first side 422 are third plate 450 and fourth plate 460, wherein third plate 450 and fourth plate 460 extend from first side 422 of brush head 420 each at an angle therefrom. Third plate 450 and fourth plate 460 are spaced apart and angled toward each other thereby forming a generally triangular channel 455 therebetween.

A first handle 470 is provided having generally a triangular shape and bristles 475 extending therefrom. First handle 470 is dimensioned and shaped to be frictionally slid within channel 435 and held therein. Clips 477 are positioned on the distal end of first handle 470 for retaining first handle 470 in position.

A second handle 480 is provided having generally a triangular shape and bristles 485 extending therefrom. Second handle 480 is dimensioned and shaped to be frictionally slid within channel 455 and held therein. Clips 487 are positioned on the distal end of second handle 480 for retaining second handle 480 in position. It should be noted that any number of brush handles may be utilized.

It should also be noted that many brush styles are contemplated for numerous applications such as, for exemplary purposes only, paint, polish, scrub, wire and soft bristle brushes.

Similar in functionality as with the blade head attachment 20, as discussed above, locking jaws 64 and 68 of retaining clip 61 extends through throughhole 458 of brush head 420 and into and through apertures 110 and 112 of bell-shaped member 100, thereby removably securing brush head 420 to bell-shaped member 100. Locking jaws 64 and 68 are dimensioned and positioned such that when locking jaws 64 and 68 are extended through retaining apertures 110 and 112, tabs 65 and 69, respectively, are urged outward and against lips 111 and 113, respectively. Locking jaws 64 and 68 are flexible enough to allow tabs 65 and 69 to be squeezed toward each other by a hand force to disengage lips 66 and 70, respectively, thereby allowing retaining clip 61 to be removed and thus brush head 420 to be disengaged from bell-shaped member 100.

Figure 8:
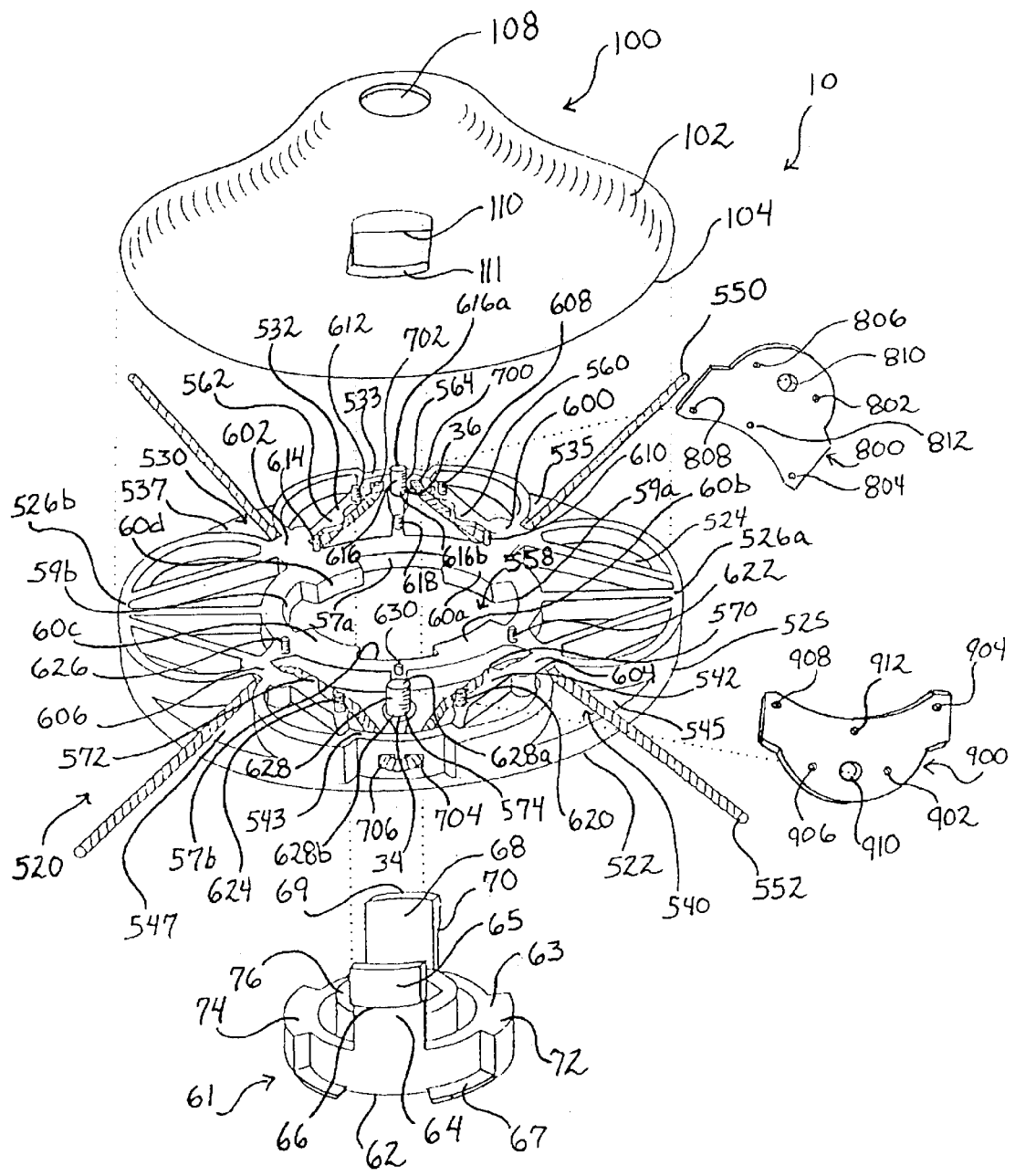
FIG. 8 is a perspective view of a fixed-line cutting assembly according to an alternate embodiment of the present invention shown in a separated position.

Now referring to FIG. 8, a fixed-line head 520 is provided. Fixed-line head 520 comprises a first side 522, a second side 524 and a peripheral wall 525, wherein fixed-line head 220 is generally cylindrically shaped. A throughhole 558 is formed at the center of fixed-line head 520 for receiving retaining clip 61. A plurality of support ribs 526a, 526b are positioned on opposing sides of throughhole 558 to provide structural support for fixed-line head 520. A plurality of strategically positioned guide ribs 532 and 542 extend from second side 524 and are positioned to form generally V-shaped channels 530 and 540, respectively, on opposing radial sides of fixed-line head 520.

Cutting line 550 is channeled through V-shaped channel 530 and extends to the exterior of fixed line head 520 at both ends through a first aperture 535 and a second aperture 537, wherein first aperture 535 is approximately ninety radial degrees from second aperture 537. Formed preferably on peripheral wall 525 and centered between first aperture 535 and second aperture 537 are center apertures 700 and 702. Specifically, cutting line 550 is first channeled through first aperture 535 and into V-shaped channel 530, through center aperture 700, through center aperture 702 and then through and out of second aperture 537.

Integrally formed to guide rib 532 are bridges 600 and 602, wherein bridge 600 extends over first aperture 535 and bridge 602 extends over aperture 537, and wherein bridges 600 and 602 function to further secure cutting line 550 within channel 530. Retaining members 560, 562 and 564 extend from guide ribs 532 and over V-shaped channel 530 thereby extending over line 550 to retain line 550 into position within channel 530. First retaining member 560 is preferably positioned at the distal end of V-shaped guide rib 532; second retaining member 562 preferably is positioned at the other distal end of V-shaped guide rib 532; and third retaining member 564 is preferably centered between first retaining member 560 and second retaining member 562.

Preferably flanking first retaining member 560 are pins 608 and 610, and pins 612 and 614 preferably flank second retaining member 562. Positioned preferably on third retaining member 564 is pin 616, and positioned preferably proximal to pin 616 is pin 618 formed preferably proximal to throughhole 558. Pins 608, 610, 612, 614, 616 and 618 are received by throughholes 802, 804, 806, 808, 810 and 812, respectively, formed in a cap 800, wherein cap 800 is preferably generally trapezoidal shaped and dimensioned to conform to the generally placement of pins 608, 610, 612, 614, 616 and 618. Cap 800 preferably functions to protect cutting line 550.

Cutting line 552 is channeled through V-shaped channel 540 and extends to the exterior of fixed line head 520 at both ends through a first aperture 545 and a second aperture 547, wherein first aperture 545 is approximately ninety radial degrees from second aperture 547. Formed preferably on peripheral wall 525 and centered between first aperture 545 and second aperture 547 are center apertures 704 and 706. Specifically, cutting line 552 is first channeled through first aperture 545 and into V-shaped channel 540, through center aperture 704, through center aperture 706 and then through and out of second aperture 547.

Integrally formed to guide rib 542 are bridges 604 and 606, wherein bridge 604 extends over first aperture 545 and bridge 606 extends over aperture 547, and wherein bridges 604 and 606 function to further secure cutting line 552 within channel 540. Retaining members 570, 572 and 574 extend from guide ribs 542 and over V-shaped channel 540 thereby extending over line 552 into position within channel 540. First retaining member 570 is preferably positioned at the distal end of V-shaped guide rib 542; second retaining member 572 preferably is positioned at the other distal end of V-shaped guide rib 542; and third retaining member 574 is preferably centered between first retaining member 570 and second retaining member 572.

Preferably flanking first retaining member 570 are pins 620 and 511, and pins 624 and 626 preferably flank second retaining member 572. Positioned preferably on third retaining member 574 is pin 628, and positioned preferably proximal to pin 628 is pin 630 formed preferably proximal to throughholes 902, 904, 906, 908, 910 and 912, respectively, formed in a cap 900, wherein cap 900 is preferably generally trapezoidal shaped and dimensioned to conform to the generally placement of pins 620, 622, 624, 626, 628 and 630. Cap 900 preferably functions to protect cutting line 552.

Because of the semi-rigidity of lines 550 and 552 and because of the frictional contact between V-shaped guide ribs 532 and 542, respectively, and retaining members 560, 562, 564 and retaining members 570, 572, 574, respectively, lines 550 and 552 are removably fixed within channels 530 and 540, respectively, such that during rotational cutting, lines 550 and 552 will remain in the position as initially installed. A user can remove lines 550 and 552 to replace or inspect by simply manipulating lines 550 and 552 around the respective retaining members 560, 562, 564 and retaining members 570, 572, 574, respectively, as well as by manipulating lines 550 and 552 through first and second apertures 535 and 537, and 545 and 547, respectively, and center apertures 700 and 702, and 704 and 706, respectively.

Similar in functionality as with the blade head attachment 20, as discussed above, locking jaws 64 and 68 of retaining clip 61 extends through throughhole 558 of fixed-line head 520 and into and through apertures 110 and 112 of bell-shaped member 100, thereby removably securing fixed line head 520 to bell-shaped member 100. Locking jaws 64 and 68 and dimensioned and positioned such that when locking jaws 64 and 68 are extended through retaining apertures 110 and 112, tabs 65 and 69, respectively. Locking jaws 64 and 68 are flexible enough to allow tabs 65 and 69 to be squeezed toward each other by a hand force to disengage lips 66 and 70, respectively, from lips 111 and 113 of retaining apertures 110 and 112, respectively, thereby allowing retaining clip 61 to be removed and thus fixed-line head 520 to be disengaged from bell-shaped member 100.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed:

1. A rotary apparatus for attachment to a rotating shaft, said rotary apparatus comprising:

a mounting member including:

a centrally defined receptacle for receiving said rotating shaft; and a fastener located in said centrally defined receptacle for attaching said mounting member to said rotating shaft; and at least two retaining apertures defined in said mounting member proximate to said receptacle and open to an exterior surface of the mounting member;

a head member attachable to said mounting member and having a centrally positioned passageway therethrough, said passageway being larger than said centrally defined receptable of said mounting member, said head member carrying a tool; and a retaining clip for releasably locking said head member to said mounting member, said retaining clip adapted to fit within said centrally positioned passageway and having a plurality of retaining jaws, each retaining jaw being adapted to extend through said passageway of said head member and to be releasably received by one of said retaining apertures defined in said mounting member and accessible from the exterior surface of said mounting member.

2. The rotary apparatus of claim 1, wherein said mounting member has a first bell-shaped side and a generally flat second side.

3. The rotary apparatus of claim 2, wherein said head member comprises a first side and a second side and is generally cylindrically-shaped, wherein said second side of said head member is engageable with said flat second side of said mounting member.

4. The rotary apparatus of claim 1, wherein said centrally positioned passageway of said head member carries a plurality of centrally extending tabs, each two adjacent tabs defining a channel therebetween capable of receiving said retaining jaws therethrough.

5. The rotary apparatus of claim 3, wherein said first side of said head member is generally flat and said centrally positioned passageway of said head member is generally cylindrically shaped, and wherein said retaining clip is generally cylindrically shaped to complement said passageway of said head member and has a flat bottom side such that, when attached to said mounting member by said retaining jaws, said flat bottom side of said retaining clip and said generally flat first side of said head member are flush with each other.

6. The rotary apparatus of claim 1, wherein each retaining aperture of said mounting member defines a securing lip and wherein each retaining jaw is removably secured to said mounting member by engagement with said lip defined by said corresponding retaining aperture of said mounting member.

7. The rotary apparatus of claim 1, wherein each pair of retaining jaws of said retaining clip extends from radially opposing positions.

8. The rotary apparatus of claim 1, wherein said head member further comprises at least one cutting blade.

9. The rotary apparatus of claim 8, wherein said at least one cutting blade further comprises a pin passageway defined therethrough, said pin passageway dimensioned to receive at least one extending pin therethrough and to permit pivotal rotation of said at least one cutting blade therearound, said at least one extending pin being carried by said second side of said head member.

10. The rotary apparatus of claim 1, wherein said retaining apertures are generally rectangular-shaped.

* * * * *